United States Patent
Zhao

(10) Patent No.: US 11,516,820 B2
(45) Date of Patent: Nov. 29, 2022

(54) RESOURCE ALLOCATION METHOD FOR SIDELINK AND TERMINAL

(71) Applicant: DATANG MOBILE COMMUNICATIONS EQUIPMENT CO., LTD., Beijing (CN)

(72) Inventor: Yali Zhao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 0 days.

(21) Appl. No.: 17/268,571

(22) PCT Filed: Aug. 16, 2019

(86) PCT No.: PCT/CN2019/100954
§ 371 (c)(1),
(2) Date: Feb. 15, 2021

(87) PCT Pub. No.: WO2020/035045
PCT Pub. Date: Feb. 20, 2020

(65) Prior Publication Data
US 2021/0168826 A1 Jun. 3, 2021

(30) Foreign Application Priority Data
Aug. 16, 2018 (CN) .......................... 201810935454.6

(51) Int. Cl.
*H04W 72/10* (2009.01)
*H04W 28/02* (2009.01)
(Continued)

(52) U.S. Cl.
CPC ....... *H04W 72/10* (2013.01); *H04W 28/0236* (2013.01); *H04W 72/048* (2013.01);
(Continued)

(58) Field of Classification Search
CPC .............. H04L 5/0044; H04W 28/02; H04W 28/0236; H04W 72/02; H04W 72/042;
(Continued)

(56) References Cited

U.S. PATENT DOCUMENTS

2019/0215717 A1* 7/2019 Lee ........................ H04W 24/10
2019/0357235 A1* 11/2019 Wang ................ H04W 72/1268
(Continued)

FOREIGN PATENT DOCUMENTS

CN 106658736 A 5/2017
CN 106961741 A 7/2017
(Continued)

OTHER PUBLICATIONS

"Consideration of Grant-free Transmission from LCP perspective", R2-1711597, 3GPP TSG RAN WG2 #99bis, Prague, Czech Republic, Oct. 9-13, 2017.
(Continued)

*Primary Examiner* — Kashif Siddiqui
(74) *Attorney, Agent, or Firm* — Ladas & Parry, LLP

(57) ABSTRACT

Provided are a resource allocation method for a sidelink and a terminal, which relates to the technical field of communications. The resource allocation method for a sidelink applied to the terminal includes: obtaining a mapping relationship between a specific target of the sidelink and a logical channel priority (LCP) restriction parameter of the sidelink; and performing resource allocation of the sidelink according to the mapping relationship; where the specific target comprises: a Quality of Service (QoS) parameter or a logical channel.

20 Claims, 2 Drawing Sheets

(51) Int. Cl.
*H04W 72/04* (2009.01)
*H04W 72/08* (2009.01)
*H04W 72/12* (2009.01)
*H04W 88/06* (2009.01)

(52) U.S. Cl.
CPC ....... *H04W 72/08* (2013.01); *H04W 72/1226* (2013.01); *H04W 88/06* (2013.01)

(58) Field of Classification Search
CPC . H04W 72/048; H04W 72/08; H04W 72/087; H04W 72/10; H04W 72/1226; H04W 76/14; H04W 88/04; H04W 88/06
See application file for complete search history.

(56) References Cited

U.S. PATENT DOCUMENTS

| | | | |
|---|---|---|---|
| 2020/0351915 A1 | 11/2020 | Zhao et al. | |
| 2020/0359368 A1* | 11/2020 | Loehr | H04W 72/02 |
| 2021/0029720 A1* | 1/2021 | Wang | H04W 72/10 |
| 2021/0144580 A1* | 5/2021 | Alfarhan | H04W 80/02 |
| 2021/0168645 A1* | 6/2021 | Adjakple | H04W 40/12 |
| 2021/0227573 A1* | 7/2021 | Fröberg Olsson | H04W 72/14 |
| 2021/0274545 A1* | 9/2021 | Adjakple | H04W 28/0268 |
| 2022/0022244 A1* | 1/2022 | Zhao | H04W 72/1242 |

FOREIGN PATENT DOCUMENTS

| | | |
|---|---|---|
| CN | 109756986 A | 5/2019 |
| EP | 3273634 A1 | 1/2018 |
| WO | 2017186160 A1 | 11/2017 |

OTHER PUBLICATIONS

International Search Report from PCT/CN2019/100954, dated Oct. 29, 2019, with English translation from WIPO.
Written Opinion of the International Searching Authority from PCT/CN2019/100954, dated Oct. 29, 2019, with English translation from WIPO.
International Preliminary Report on Patentability from PCT/CN2019/100954, dated Feb. 16, 2021, with English translation from WIPO.
Extended European Search Report from corresponding EP app. No. 19850693.3, dated Oct. 22, 2021, all pages.
Huawei, HiSilicon, "Discussion on LCP restrictions", R2-1802259, 3GPP TSG-RAN WG2 Meeting 101, Athens, Greece, Feb. 26-Mar. 3, 2018, all pages.

* cited by examiner

RESOURCE ALLOCATION METHOD FOR SIDELINK AND TERMINAL

CROSS-REFERENCE TO RELATED APPLICATIONS

This application is the U.S. national phase of PCT Application No. PCT/CN2019/100954 filed on Aug. 16, 2019, which claims a priority to Chinese Patent Application No. 201810935454.6 filed in China on Aug. 16, 2018, the disclosures of which are hereby incorporated in their entireties herein.

TECHNICAL FIELD

The present disclosure relates to the technical field of communications, in particular to a resource allocation method for a sidelink and a terminal.

BACKGROUND

Logical channel prioritization (LCP) of a Uu interface in a Long Term Evolution (LTE) system is performed on the basis of a priority parameter (priority) corresponding to a single radio bearer (RB) configured by network settings.

Direct communications are allowed between devices close to each other. For ease of description, a link of the direct communication between terminals is referred to as a Sidelink (referred to as direct communication link or bypass), and a corresponding air interface is also referred to as a direct communication interface, which is illustrated in FIG. 1.

Devices in direct communications may be all on a network or off a network; or part of the devices are on a network and other part of the devices are off a network. For a terminal on a network, the sidelink supports two resource allocation modes:

resource allocation mode based on network scheduling: that is, a network directly allocates a specific time/frequency domain resource used by sidelink transmission for a transmitting terminal in direct communications; and resource allocation mode based on terminal self-selecting: that is, a resource pool is pre-configured, or configured by a network for sidelink transmission, a terminal selects a resource for sidelink transmission from the transmission resource pool.

It is defined in the related art how to perform a logical channel priority (LCP) of a Uu interface and a sidelink in an LTE system. However, there is no scheme to execute the LCP of the sidelink for resource allocation in a New Radio (NR) system.

SUMMARY

Embodiments of the present disclosure provide a resource allocation method for a sidelink and a terminal, to solve a problem that network communication is incomplete, and normal data transmission in a sidelink in a 5G system can not be guaranteed, because the new radio system does not define how to execute a logic channel priority process of the sidelink when a communication interface is directly used for data transmission.

In order to resolve the above technical problem, an embodiment of the present disclosure provides a resource allocation method for a sidelink, which is applied to a terminal and includes:

obtaining a mapping relationship between a specific target of the sidelink and a logical channel priority (LCP) restriction parameter of the sidelink; and performing resource allocation of the sidelink according to the mapping relationship;

where the specific target includes: a Quality of Service (QoS) parameter or a logical channel.

Further, the LCP restriction parameter of the sidelink includes at least one of following information: allowed subcarrier spacing; or maximum physical sidelink shared channel (PSSCH) duration.

Specifically, when the terminal is on a network, the mapping relationship is configured by a network device or pre-configured; and when the terminal is off a network, the mapping relationship is pre-configured.

Further, in a case that the mapping relationship is configured by the network device, and the specific target includes the quality of service (QoS) parameter, the mapping relationship is configured in at least one of following manners: broadcasting; or first preset signaling, where the first preset signaling is a dedicated signaling, and the dedicated signaling includes at least one of: a radio resource control (RRC) signaling, a medium access control (MAC) signaling, or a physical layer signaling.

Further, in a case that the mapping relationship is configured by broadcasting, the mapping relationship is configured by using a preset message; and the preset message includes at least one of: a master information block (MIB) and a system information block (SIB) dedicated for the sidelink.

Specifically, in a case that the mapping relationship is configured by using the first preset signaling, the obtaining the mapping relationship between the specific target of the sidelink and the logical channel priority (LCP) restriction parameter of the sidelink includes: receiving, from the network device, a mapping relationship between all the QoS parameters supported by the sidelink and the LCP restriction parameter of the sidelink.

Specifically, in a case that the mapping relationship is configured by using the first preset signaling, the obtaining the mapping relationship between the specific target of the sidelink and the logical channel priority (LCP) restriction parameter of the sidelink includes:

receiving, from the network device, a mapping relationship between a QoS parameter corresponding to a logical channel of the sidelink that currently has a data transmission requirement and the LCP restriction parameter of the sidelink; or receiving, from the network device, a mapping relationship between a QoS parameter corresponding to a currently established logical channel of the sidelink and the LCP restriction parameter of the sidelink.

Further, before obtaining the mapping relationship between the specific target of the sidelink and the logical channel priority (LCP) restriction parameter of the sidelink, the method further includes: transmitting first auxiliary information to the network device; where the first auxiliary information is used for enabling the network device to configure the mapping relationship between the QoS parameter and the LCP restriction parameter of the sidelink for the terminal.

Specifically, the first auxiliary information includes: the QoS parameter corresponding to the logical channel of the sidelink of the terminal that currently has the data transmission requirement; or the first auxiliary information includes: the QoS parameter corresponding to the currently established logical channel of the sidelink of the terminal.

Specifically, a triggering condition for reporting the first auxiliary information includes: event triggered report and/or periodical report.

Specifically, in case that the triggering condition for reporting the first auxiliary information includes the event triggered report, an event for the event triggered report includes that: a QoS parameter of a direct communication service that currently has the data transmission requirement is changed caused by establishment of a logical channel or release of the logical channel of the sidelink of the terminal.

Specifically, in case that the triggering condition for reporting the first auxiliary information includes the periodical report, a periodicity of the periodical report is configured by the network device and/or defined by a protocol.

Further, in case that the specific target includes the QoS parameter, the QoS parameter includes at least one of: priority of direct communication interface data packet (PPPP), reliability of direct communication interface data packet (PPPR), or packet delay budget (PDB) of direct communication interface data packet.

Further, in a case that the mapping relationship is configured by the network device, and the specific target includes the logical channel, the obtaining the mapping relationship between the specific target of the sidelink and the logical channel priority (LCP) restriction parameter of the sidelink includes: receiving the mapping relationship between the logical channel and the LCP restriction parameter of the sidelink, where the mapping relationship is configured by the network device by using a second preset signaling; where the logical channel is embodied in a form of: a combination of direct communication target identification information and direct communication interface logical channel identification information; or direct communication interface logical channel identification information.

Specifically, before receiving the mapping relationship between the logical channel and the LCP restriction parameter of the sidelink, where the mapping relationship is configured by the network device by using the second preset signaling, the method further includes: transmitting second auxiliary information to the network device, where the second auxiliary information includes: the direct communication target identification information, the direct communication interface logical channel identification information, and a QoS parameter of a logical channel corresponding to the direct communication interface logical channel identification information; or, the second auxiliary information includes: the direct communication interface logical channel identification information, and a QoS parameter of a logical channel corresponding to the direct communication interface logical channel identification information.

Specifically, a triggering condition for reporting the first auxiliary information includes: event triggered report and/or periodical report.

Specifically, in a case that the triggering condition for reporting the second auxiliary information includes: the event triggered report, an event for the event triggered report includes: the sidelink of the terminal establishing a logical channel or releasing the logical channel.

Specifically, in a case that the triggering condition for reporting the second auxiliary information includes: the periodical report, a periodicity of the periodical report is configured by the network device and/or defined by a protocol.

Further, the performing resource allocation of the sidelink according to the mapping relationship includes:

for each target uplink grant in allowed uplink grants, determining a target logical channel that is capable of using the target uplink grant;

determining identification information of the first target according to the target logical channel; and performing resource allocation of the sidelink according to the identification information of the first target.

Specifically, the determining the target logical channel that is capable of using the target uplink grant includes: determining, according to a preset condition, a target logical channel that is capable of using the target uplink grant and has a direct communication data transmission requirement; where the preset condition includes that:

an allowed subcarrier spacing list in the LCP restriction parameter corresponding to the target logical channel includes a sub carrier spacing corresponding to the target uplink grant; and an allowed maximum PSSCH duration in the LCP restriction parameter corresponding to the target logical channel is greater than or equal to a PSSCH transmission duration corresponding to the target uplink grant.

Specifically, the determining identification information of the first target according to the target logical channel includes:

selecting, among the target logical channels, a logical channel with the highest priority; and determining, according to the logic channel with the highest priority, a direct communication target identifier corresponding to the logic channel with the highest priority, and taking the direct communication target identifier as the identification information of the first target.

Specifically, the performing resource allocation of the sidelink according to the identification information of the first target includes:

selecting, from the target logical channels, all logical channels corresponding to the identification information of the first target, and sorting all the logical channels corresponding to the identification information of the first target in a descending order of priorities; and allocating resources for respective logical channels sequentially according to the descending order of priorities, until the resources are allocated to all the logical channels or all the resources are exhausted.

An embodiment of the present disclosure also provides a terminal, which includes a memory, a processor, and a program stored on the memory and executable on the processor. When executing the problem, the processor is configured to implement following steps:

obtaining a mapping relationship between a specific target of the sidelink and a logical channel priority (LCP) restriction parameter of the sidelink; and performing resource allocation of the sidelink according to the mapping relationship, where the specific target includes: a Quality of Service (QoS) parameter or a logical channel.

Further, the LCP restriction parameter of the sidelink includes at least one of following information: allowed subcarrier spacing; or maximum physical sidelink shared channel (P SSCH) duration.

Specifically, when the terminal is on a network, the mapping relationship is configured by a network device or pre-configured; and when the terminal is off a network, the mapping relationship is pre-configured.

Further, in a case that the mapping relationship is configured by the network device, and the specific target includes the quality of service (QoS) parameter, the mapping relationship is configured in at least one of following manners: broadcasting; or first preset signaling, where the first preset signaling is a dedicated signaling, and the dedicated signaling includes at least one of: a radio resource control (RRC) signaling, a medium access control (MAC) signaling, or a physical layer signaling.

Further, in a case that the mapping relationship is configured by broadcasting, the mapping relationship is configured by using a preset message; and the preset message includes at least one of: a master information block (MIB) and a system information block (SIB) dedicated for the sidelink.

Further, in a case that the mapping relationship is configured by using the first preset signaling, the processor executes the program to preform following steps:

receiving, from the network device, a mapping relationship between all the QoS parameters supported by the sidelink and the LCP restriction parameter of the sidelink.

Further, in a case that the mapping relationship is configured by using the first preset signaling, the processor executes the program to preform following steps:

receiving, from the network device, a mapping relationship between a QoS parameter corresponding to a logical channel of the sidelink that currently has a data transmission requirement and the LCP restriction parameter of the sidelink; or receiving, from the network device, a mapping relationship between a QoS parameter corresponding to a currently established logical channel of the sidelink and the LCP restriction parameter of the sidelink.

Specifically, before obtaining the mapping relationship between the specific target of the sidelink and the logical channel priority (LCP) restriction parameter of the sidelink, the processor executes the program to preform following steps:

transmitting first auxiliary information to the network device;

where the first auxiliary information is used for enabling the network device to configure the mapping relationship between the QoS parameter and the LCP restriction parameter of the sidelink for the terminal.

Specifically, the first auxiliary information includes: the QoS parameter corresponding to the logical channel of the sidelink of the terminal that currently has the data transmission requirement; or the first auxiliary information includes: the QoS parameter corresponding to the currently established logical channel of the sidelink of the terminal.

Specifically, a triggering condition for reporting the first auxiliary information includes: event triggered report and/or periodical report.

Specifically, in case that the triggering condition for reporting the first auxiliary information includes the event triggered report, an event for the event triggered report includes that: a QoS parameter of a direct communication service that currently has the data transmission requirement is changed caused by establishment of a logical channel or release of the logical channel of the sidelink of the terminal.

Specifically, in case that the triggering condition for reporting the first auxiliary information includes the periodical report, a periodicity of the periodical report is configured by the network device and/or defined by a protocol.

Further, in case that the specific target includes the QoS parameter, the QoS parameter includes at least one of: priority of direct communication interface data packet (PPPP), reliability of direct communication interface data packet (PPPR), or packet delay budget (PDB) of direct communication interface data packet.

Further, in a case that the mapping relationship is configured by the network device, and the specific target includes the logical channel, the processor executes the program to preform following steps:

receiving the mapping relationship between the logical channel and the LCP restriction parameter of the sidelink, where the mapping relationship is configured by the network device by using a second preset signaling;

where the logical channel is embodied in the form of: a combination of the direct communication target identification information and the direct communication interface logical channel identification information or the direct communication interface logical channel identification information.

Specifically, before receiving the mapping relationship between the logical channel and the LCP restriction parameter of the sidelink, where the mapping relationship is configured by the network device by using the second preset signaling, the processor executes the program to preform following steps:

transmitting second auxiliary information to the network device, where the second auxiliary information includes: the direct communication target identification information, direct communication interface logical channel identification information, and a QoS parameter of a logical channel corresponding to the direct communication interface logical channel identification information; or, the second auxiliary information includes: the direct communication interface logical channel identification information, and a QoS parameter of a logical channel corresponding to the direct communication interface logical channel identification information Specifically, a triggering condition for reporting the second auxiliary information includes: event triggered report and/or periodical report.

Specifically, in a case that the triggering condition for reporting the second auxiliary information includes: the event triggered report, an event for the event triggered report includes: establishing a logical channel or releasing the logical channel by the terminal for the sidelink.

Specifically, the triggering condition for reporting the second auxiliary information includes: the periodical report, a periodicity of the periodical report is configured by the network device and/or defined by a protocol.

Further, the processor executes the program to preform following steps:

for each target uplink grant in allowed uplink grants, determining a target logical channel that is capable of using the target uplink grant;

determining identification information of the first target according to the target logical channel; and performing resource allocation of the sidelink according to the identification information of the first target.

Further, the processor executes the program to preform following steps:

determining, according to a preset condition, a target logical channel that is capable of using the target uplink grant and has a direct communication data transmission requirement;

where the preset condition includes that:

an allowed subcarrier spacing list in the LCP restriction parameter corresponding to the target logical channel includes a sub carrier spacing corresponding to the target uplink grant; and an allowed maximum PSSCH duration in the LCP restriction parameter corresponding to the target logical channel is greater than or equal to a PSSCH transmission duration corresponding to the target uplink grant.

Further, the processor executes the program to preform following steps:

selecting, among the target logical channels, a logical channel with the highest priority; and determining, according to the logic channel with the highest priority, a direct communication target identifier corresponding to the logic channel with the highest priority, and taking the direct communication target identifier as the identification information of the first target.

Further, the processor executes the program to preform following steps:

selecting all logical channels corresponding to the identification information of the first target from the target logical channels, and sorting all the logical channels corresponding to the identification information of the first target in descending order of priorities; and allocating resources for respective logical channels sequentially according to the descending order of priorities until the resources are allocated to all the logical channels or all the resources are exhausted.

An embodiment of the present disclosure also provides a computer-readable storage medium having a computer program stored thereon, where the computer program, when executed by a processor, implements the above resource allocation method for a sidelink.

An embodiment of the present disclosure also provides a terminal, including:

an obtaining module, configured to obtain a mapping relationship between a specific target of the sidelink and a logical channel priority (LCP) restriction parameter of the sidelink; and an allocation module, configured to perform resource allocation of the sidelink according to the mapping relationship, where the specific target includes: a Quality of Service (QoS) parameter or a logical channel.

The present disclosure has the following beneficial effects: based on the above scheme, a mapping relationship between a specific target of the sidelink and a logical channel priority (LCP) restriction parameter of the sidelink is obtained, and resource allocation of the sidelink is performed according to the mapping relationship, so that a network communication process is improved, and the normal data transmission in the sidelink can be guaranteed in a 5G system.

BRIEF DESCRIPTION OF THE DRAWINGS

In order to more clearly illustrate the technical solution of embodiments of the present disclosure, drawings used in the description of the embodiments will be briefly described below. It is obvious that the drawings in the following description are only some embodiments of the present disclosure, and those skilled in the art can obtain other drawings based on these drawings without creative effort.

DETAILED DESCRIPTION

Figure 1:
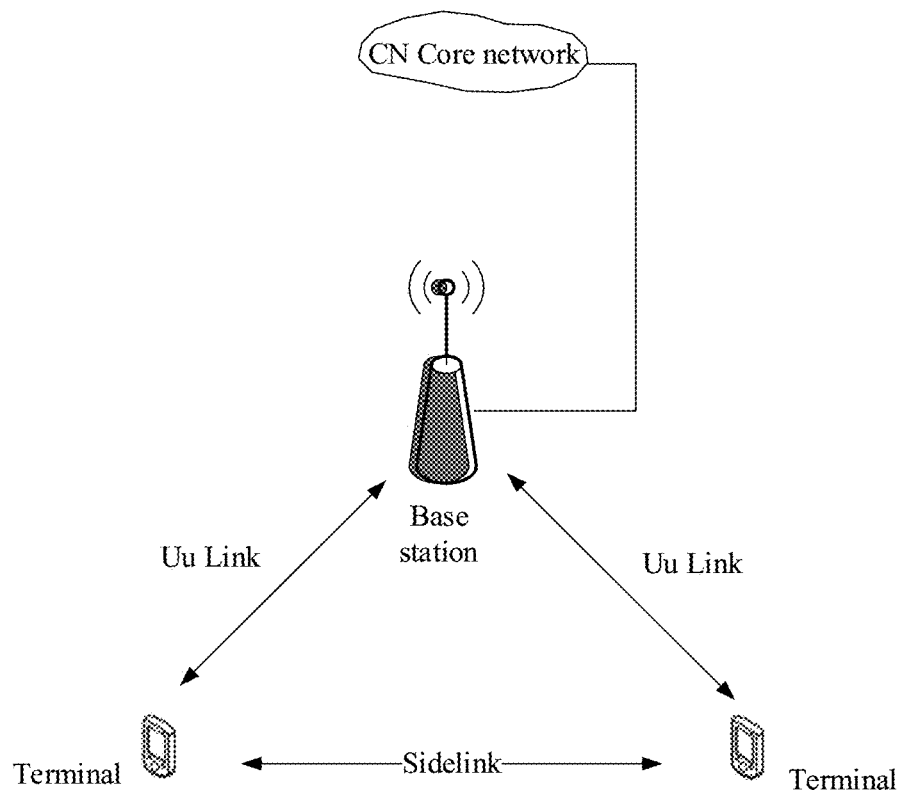
FIG. 1 shows a schematic diagram of communication links between a terminal and a base station, and between a terminal and another terminal.

To make the objective, technical solution and advantages of the present disclosure clearer, detailed description will be made in conjunction with the drawings and the embodiments.

First, some concepts mentioned in the embodiments of the present disclosure are explained as follows.

1) LCP of a Uu interface in a LTE system is performed on the basis of a priority parameter (priority) corresponding to a single radio bearer (RB) configured by a network. The specific implementation process is as follows:

Step 1, performing the first round of resource allocation in descending order of priority parameters of all logical channels with tokens, where the first round of resource allocation is performed based on a prioritized bit rate (PBR) of each logical channel, and at the same time, the number of tokens available for each logical channel is updated according to a situation of the resource allocation; and Step 2: performing the second round of resource allocation, if there are remaining resources. The second round of resource allocation is to allocate resources for data other than PBR in descending order of priority parameters of all logical channels with data transmission. Resource allocation is completed until resources are allocated to the data of all the logical channels with tokens, or until resources are exhausted.

2) LCP for LTE sidelink

The LCP for the LTE sidelink is as follows:

Step 0: a direct communication target (destination) is selected.

The target corresponding to a LC which has the highest priority and has data available in a current direct communication interface is selected.

In order to generate each medium access control (MAC) protocol data unit (PDU), the terminal needs to perform the following operations:

Step 1: a resource is allocated to LCs which correspond to the target selected in step 0, have the highest priority and have data available.

Step 2: if there are remaining resources, resources are sequentially allocated in descending order to the LCs that have data available and correspond to the target selected by step0, until the resources are used up or all the LCs are allocated with resources.

3) LCP for a Uu Interface of New Radio (NR)

A 5G NR system mainly supports three types of services: enhanced Mobile Broadband (eMBB); massive Machine Type Communications (mMTC); and Ultra-Reliable and Low Latency Communications (URLLC).

The physical layer of the NR system supports multiple numerologies or Transmission Timing Intervals (TTI). The respective concepts of Numerology and TTI are as follows:

Numerology is a technical term for 3GPP RANI, which may be translated into parameter set. The main difference between different numerologies is that different numerologies support different subcarrier spacings. For example, a subcarrier spacing supported by the 5GNR system at least includes: 15 KHz and 60 KHz. The numerologies corresponding to these two different subcarrier spacings are independent. In general, a numerology used by a high-speed terminal is different from that used by a low-speed terminal; and numerologies used for high and low frequencies are also different. In addition to a fact that the use of different numerologies is related to speed and frequency, there is also an understanding in the art or industry that different services may use different numerologies, such as URLLC and eMBB.

In an LTE system in the related art, a length of TTI is 1 ms. Starting from LTE R14, to support latency reduction, different TTI lengths are introduced, such as a length of one orthogonal frequency division multiplex (OFDM) symbol. Different TTI lengths are used in 5G systems and may be applied to each numerology. That is, different numerologies in 5G NR may use different TTI lengths or the same TTI length, and the TTI lengths used for different terminals on any one occasion in a numerology may be dynamically changed. The selection of a TTI length is mainly related to a latency of a service. For example, for a URLLC service which has a relatively high requirement on its supported latency, a shorter TTI length may be selected, such as the TTI length of one OFDM symbol.

The physical layer of the NR system supports multiple numerologies or TTIs. A numberology and/or TTI corresponding to a bearer/logical channel is configured through a network. For example, the network may configure the numberology and/or TTI corresponding to a bearer/logical channel through radio resource control (RRC) signaling, when the bearer/logical channel is established. The selection of a TTI length is mainly related to a latency of a service. For example, for a URLLC service which has a relatively high requirement on its supported latency, a shorter TTI length may be selected, such as the TTI length of one OFDM symbol.

For NR systems, factors to be considered for Uu interface LCP are referred to as LCP restriction parameters (restrictions), including:
   allowedSCS-List, for reflecting a latency requirement;
   maxPUSCH-Duration, for reflecting a latency requirement;
   configuredGrantType1Allowed, for URLLC; and
   allowedServingCells, introduced by duplication, but its usage is not limited to duplication.

A specific resource allocation process based on LCP restrictions is as follows:
   step 1, for each uplink (UL) grant, selecting a logical channel that can use the UL grant;
   for each UL grant, selecting the logical channel that can use the UL grant as follows (the following requirements need to be met simultaneously):
   selecting a logical channel of a subcarrier spacing (SCS) index for the UL grant from an allowed subcarrier spacing list (allowed SCS-List) as configured; and
   selecting a logical channel whose maximum PUSCH duration (maxPUSCH-Duration) as configured is greater than or equal to a PUSCH transmission duration corresponding to the UL grant;
   if the UL grant is Type 1 configured grant, a logical channel whose configuredGrantType1 Allowed is set to TRUE needs to be selected; and the UL grant is located within the configured allowedServingCells of the logical channel.
   step 2, performing resource allocation for each UL grant;
   for each UL grant, the performing resource allocation for logical channels that can use the UL grant includes:
   allocating resources to all logical channels with tokens (Bj)>0 which meet PBR requirements in descending order of priorities;
   updating Bj of each logical channel according to the resource allocation situation of the previous step; and if there are remaining resources, reallocating resources to remaining data of respective logical channels in descending order of respective logical priorities, until the resources are exhausted or no data needs to be allocated with a resource.

Specifically, the present disclosure provides a resource allocation method for a sidelink and a terminal, aiming at a problem that network communication is incomplete, and normal data transmission of a sidelink in a 5G system can not be guaranteed, because a new radio system does not define how to execute a logic channel priority process of the sidelink when a communication interface is directly used for data transmission.

Figure 2:
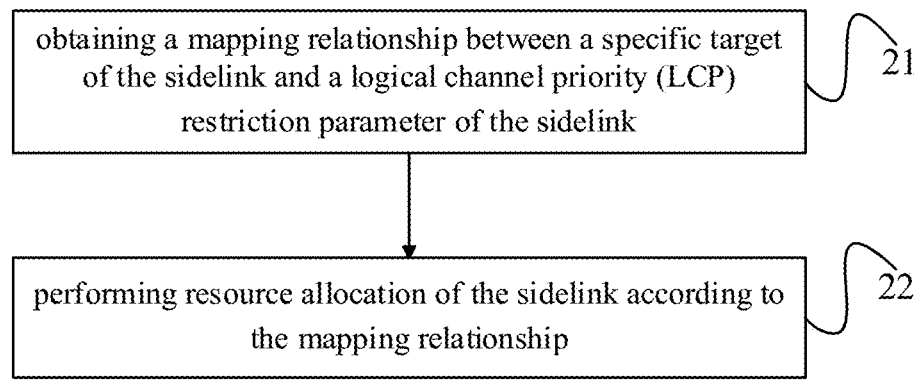
FIG. 2 shows a flow diagram of a resource allocation method for a sidelink according to an embodiment of the present disclosure.

As shown in FIG. 2, the resource allocation method for a sidelink is provided according to an embodiment of the present disclosure, which is applied to the terminal and includes:

step 21, obtaining a mapping relationship between a specific target of the sidelink and a logical channel priority (LCP) restriction parameter of the sidelink;

it is noted that the sidelink refers to the above-mentioned Sidelink, the specific target includes: Quality of Service (QoS) parameter or logical channel, and it is further noted that the QoS parameter includes at least one of the following items: priority of direct communication interface data packet (PPPP), reliability of direct communication interface data packet (PPPR), or packet delay budget (PDB) of direct communication interface data packet.

step 22, performing resource allocation of the sidelink according to the mapping relationship;

it is further noted that the LCP restriction parameter(s) of the sidelink includes at least one of the following information:

A11, allowed subcarrier spacing, where the subcarrier spacing refers to a subcarrier spacing that is allowed to be used by the terminal in the sidelink; or A12, maximum duration of physical sidelink shared channel (PSSCH).

It should be noted that when a terminal is on a network, and when the terminal is off a network, specific manners for configuring the above-mentioned mapping relationship are also different. When the terminal is on a network, the mapping relationship is configured by a network device or pre-configured; and when the terminal is off a network, the mapping relationship is pre-configured. It should be noted that the above-mentioned pre-configuration refers to configuration based on agreement in a protocol, or a terminal manufacturer directly pre-configures the mapping relationship in terminals when the terminals are out of the factory.

As specific contents of the specific target are different, processing manners of the terminal are also different. Embodiments of the present disclosure are specifically described below from different contents contained in the specific target respectively and from an aspect that the mapping relationship is configured by the network device.

First, the specific target includes a QoS parameter.

It should be noted that in this case, the mapping relationship is configured in at least one of the following ways:

B1, broadcasting;

in this case, the network device usually configures the mapping relationship via a preset message; and further, the preset message includes at least one of: a master information block (MIB) or a system information block (SIB) dedicated for the sidelink.

B2, first preset signaling.

It is noted that the first preset signaling is a dedicated signaling. Particularly, the dedicated signaling includes at least one of: a radio resource control (RRC) signaling, a medium access control (MAC) signaling, or a physical layer signaling.

It is further noted that when the mapping relationship is configured by using the first preset signaling, step 21 may be implemented in one of the following manners:

a first manner: receiving a mapping relationship between all the QoS parameters supported by the sidelink and the LCP restriction parameter(s) of the sidelink, where the mapping relationship is transmitted by the network device.

It should be noted that in this implementation manner, the network device transmits a mapping relationship between a mapping relationship between all the QoS parameters supported by the sidelink and the LCP restriction parameter(s) to the terminal.

A second manner: receiving, from the network device, a mapping relationship between a QoS parameter corresponding to a logical channel of the sidelink that currently has a data transmission requirement and the LCP restriction parameter(s) of the sidelink; or receiving, from the network device, a mapping relationship between a QoS parameter corresponding to a currently established logical channel of the sidelink and the LCP restriction parameter(s) of the sidelink.

It should be noted that in this implementation manner, the network device only transmits the mapping relationship between the QoS parameters corresponding to the logical channel that currently has a data transmission requirement (or the QoS parameters corresponding to a currently established logical channel of the sidelink) and the LCP restriction parameter(s) to the terminal. In order to ensure that the network device can know the QoS parameters corresponding to the logical channel that currently has a data transmission requirement (or the QoS parameters corresponding to a currently established logical channel of the sidelink), the terminal needs to transmit first auxiliary information to the network device, before obtaining the mapping relationship between the specific target of the sidelink and the logical channel priority (LCP) restriction parameter of the sidelink. The first auxiliary information is used for enabling the network device to configure the mapping relationship between the QoS parameter and the LCP restriction parameter(s) of the sidelink for the terminal.

Specifically, the first auxiliary information includes: the QoS parameter corresponding to the logical channel of the sidelink of the terminal that currently has the data transmission requirement; or the first auxiliary information includes: the QoS parameter corresponding to the currently established logical channel of the sidelink of the terminal.

It should be noted that when the network device transmits the mapping relationship between the QoS parameter corresponding to the logical channel of the sidelink that currently has a data transmission requirement and the LCP restriction parameter(s) of the sidelink, the first auxiliary information includes the QoS parameter corresponding to the logical channel of the sidelink of the terminal that currently has a data transmission requirement; and when the network device transmits the mapping relationship between the QoS parameter corresponding to the currently established logical channel of the sidelink and the LCP restriction parameter(s) of the sidelink, the first auxiliary information includes the QoS parameter corresponding to the currently established logical channel of the sidelink of the terminal.

It is further noted that a triggering condition for reporting the first auxiliary information includes at least one of:

C1, event triggered report;

it should be noted that in this case, an event for the event triggered report includes that: a QoS parameter of a direct communication service that currently has the data transmission requirement is changed caused by establishment of a logical channel or release of the logical channel of the sidelink of the terminal.

C2, periodical report;

it is noted that in this case, a periodicity of the periodical report is configured by the network device and/or defined by a protocol.

Second, the specific target includes a logical channel.

It should be noted that in this case, step 21 is specifically implement as follows: receiving the mapping relationship between the logical channel and the LCP restriction parameter(s) of the sidelink, where the mapping relationship is configured by the network device by using a second preset signaling.

It should be noted that the second preset signaling refers to dedicated signaling, which specifically includes at least one of: RRC signaling, MAC signaling, or physical layer signaling.

It is further noted that in this case, the logical channel is embodied in a form of: a combination of direct communication target identification information and direct communication interface logical channel identification information; or direct communication interface logical channel identification information.

That is, in this case, the network device does not directly transmit a logical channel in transmitted information, but transmits a combination of the direct communication target identification information and the direct communication interface logical channel identification information to represent the logical channel, or transmits the direct communication interface logical channel identification information to represent the logical channel.

It should also be noted that in this case, the terminal also needs to transmit second auxiliary information to the network device before receiving the mapping relationship between the logical channel and the LCP restriction parameter(s) of the sidelink, where the mapping relationship is configured by the network device by using a second preset signaling.

Specifically, the second auxiliary information includes one of the following information:

D1, direct communication target identification information (for example, Target ID), direct communication interface logical channel identification information (for example, LCD), or a QoS parameter of a logical channel corresponding to the direct communication interface logical channel identification information.

It should be noted that the direct communication target refers to: other terminals communicating with the terminal, or a direct communication service between the terminal and the other terminals.

D2, direct communication interface logical channel identification information and a QoS parameter of a logical channel corresponding to the direct communication interface logical channel identification information.

It is further noted that a triggering condition for reporting the second auxiliary information includes at least one of the following manners:

E1, event triggered report;

it should be noted that in this case, an event of event triggered report includes: by the sidelink of the terminal establishing a logical channel or releasing the logical channel.

E2, periodical report;

it should be noted that in this case, a periodicity of the periodical report is configured by the network device and/or defined by a protocol.

After obtaining the above mapping relationship, the terminal needs to allocate resources for the sidelink according to the mapping relationship. Specifically, a implementation manner of step 22 includes:

step 221, for each target uplink grant in allowed uplink grants, determining a target logical channel that is capable of using the target uplink grant;

It should be noted that the terminal performs resource allocation on each of the allowed uplink grants when performing resource allocation. In the embodiments of the present disclosure, only one of the allowed uplink grants is taken as an example, processings of the other uplink grants are the same as that of the one uplink grant, which can be deduced in a similar way. The target uplink grant mentioned in the description of this step represents a certain uplink grant.

In particular, a specific implementation of this step is as follows: determining, according to a preset condition, a target logical channel that is capable of using the target uplink grant and has a direct communication data transmission requirement;

It should be noted that the preset condition includes the following information:

F1, an allowed subcarrier spacing list (allowedSCS-List) in the LCP restriction parameter corresponding to the target logical channel includes a subcarrier spacing corresponding to the target uplink grant; and F2, an allowed maximum PSSCH duration (maxPSSCH-Duration) in the LCP restriction parameter corresponding to the target logical channel is greater than or equal to a PSSCH transmission duration corresponding to the target uplink grant.

It should be noted that the terminal needs to determine a target logical channel in a manner specified by F1 and F2.

Step 222, determining identification information of the first target according to the target logical channel;

in particular, a specific implementation of this step is as follows: selecting, among the target logical channels, a logical channel with the highest priority; and determining, according to the logic channel with the highest priority, a direct communication target identifier corresponding to the logic channel with the highest priority, and taking the direct communication target identifier as the identification information of the first target.

Step 223, performing resource allocation of the sidelink according to the identification information of the first target.

In particular, a specific implementation of this step is as follows: selecting all logical channels corresponding to the identification information of the first target from the target logical channels, and sorting all the logical channels corresponding to the identification information of the first target in descending order of priorities; and allocating resources for respective logical channels sequentially according to the descending order of priorities until resources are allocated to all the logical channels or all the resources are exhausted.

It should be noted that in a case that there are a plurality of uplink grants, the processing order of various uplink grants by the terminal depends on an implementation of the network device.

Embodiments of the present disclosure are described in detail below in specific application scenarios.

First scenario: uplink resource allocation process of a sidelink for an off-line terminal (i.e., a terminal is in an off-line state).

Step 1: an MAC layer of the off-line terminal obtains a mapping relationship between preconfigured QoS parameters and LCP restriction parameters;

it should be noted that the preconfigured mapping relationship may be from a higher layer (such as the RRC layer), or it may be preconfigured directly to the MAC layer.

Step 2: the terminal selects a resource from a transmission resource pool.

In the off-line scenario, the terminal can only use a resource allocation mode based on terminal self-selecting, and the terminal selects an appropriate resource from a pre-configured transmission resource pool according to a data volume of a logical channel of the sidelink that currently has a data transmission requirement and a requirement on the LCP restriction parameters, namely selecting at least one uplink grant.

Step 3: organizing MAC protocol data units (PDUs) for at least one uplink grant.

For each uplink grant, MAC PDUs are organized according to an LCP process of the sidelink. The detailed implementation process can be seen in the fourth scenario.

Second scenario: uplink allocation process of a sidelink for an on-line terminal (i.e., a terminal is in an on-line state).

Step 1: the on-line terminal obtains a relationship between QoS parameters and LCP restriction parameters of the sidelink.

In the on-line scenario, the mapping relationship between QoS parameters and LCP restriction parameter may be preconfigured. For example, the preconfigured mapping relationship may be from a higher layer, such as the RRC layer, or it may be preconfigured directly to the MAC layer.

The mapping relationship between QoS parameters and LCP restriction parameters of the sidelink is configured based on network settings in the following ways:

option 1: configuration through a broadcast mode, and the mapping relationship between the QoS parameters and the LCP restriction parameters is configured in an MIB or a sidelink dedicated SIB; and option 2: configuration through dedicated signaling (RRC signaling, MAC signaling, or physical layer signaling); further, there are two possibilities for configuration through the dedicated signaling:

option 2-1: the terminal reports auxiliary information, and the network device configures the mapping relationship between the QoS parameters corresponding to the logical channels of the sidelink currently having data transmission requirements and the LCP restriction parameters of the sidelink based on the auxiliary information reported by the terminal; or the network device configures the mapping relationship between the QoS parameters corresponding to the currently established logical channel of the sidelink and the LCP restriction parameters of the sidelink based on the auxiliary information reported by the terminal; and option 2-2: the terminal does not need to report auxiliary information, and the network side directly configures a mapping relationship between all the QoS parameters supported by the sidelink of the terminal and the LCP restriction parameters.

For option 2-1, the content of the auxiliary information reported by the terminal may be, but not limited to: a QoS parameter corresponding to a logical channel of the sidelink of the terminal that currently has a data transmission requirement; or, the content of the auxiliary information reported by the terminal may be, but not limited to: a QoS parameter corresponding to a currently established logical channel of the sidelink of the terminal.

A triggering condition for reporting the auxiliary information of the terminal includes at least one of the following manners:

event triggered report, that is, triggering a report for the auxiliary information by that a QoS parameter of a direct communication service that currently has the data transmission requirement is changed caused by establishment of a logical channel or release of the logical channel by the sidelink of the terminal; or periodical report, where a periodicity of the periodical report may be configured by the network device or defined by a protocol.

The QoS parameter includes at least one of: PPPP, PPPR, or PDB.

Step 3: organizing MAC protocol data units (PDUs) for at least one uplink grant.

For each uplink grant, MAC PDUs are organized according to an LCP process of the sidelink. The detailed implementation process can be referred to the fourth scenario.

Third scenario: uplink allocation process of a sidelink for an on-line terminal.

Step 1: the on-line terminal obtains a relationship between logical channels of the sidelink and LCP restriction parameters of the sidelink.

If the mapping relationship between logical channels of the sidelink and LCP restriction parameter of the sidelink is configured by a network device, the network device may configure it as follows: the network uses a dedicated signaling (RRC signaling, MAC signaling, or physical layer signaling) to configure a mapping relationship between the logical channels and the LCP restriction parameters of the sidelink, based on a combination of direct communication target identification information and direct communication interface logical channel identification information.

In a case that the mapping relationship between the logical channels of the sidelink and the LCP restriction parameters of the sidelink is configured by a network device, a terminal needs to report auxiliary information, and the content of the auxiliary information may include, but not limited to: direct communication target identification information, direct communication interface logical channel identification information and QoS parameters of a logical channel corresponding to the direct communication interface logical channel identification information.

A triggering condition for reporting the auxiliary information by the terminal includes at least one of the following manners:

event triggered report, i.e., based on establishment of a logical channel or release of the logical channel by the sidelink of the terminal; or periodical report, where a periodicity of the periodical report may be configured by the network device or defined by a protocol.

The QoS parameter includes, but not limited to: PPPP (or PPPR) in the related art, and at least one of other PDBs that may be subsequently introduced.

Step 2: the terminal obtains an uplink grant;

in an on-line scenario, the terminal may select at least one uplink grant or obtain an uplink grant from the network device side, according to different resource allocation modes.

In a case that the terminal uses a resource allocation mode based on terminal self-selecting, the terminal selects an appropriate resource from a transmission resource pool configured by a network device according to a data volume of a logical channel of the sidelink that currently has a data transmission requirement and a requirement on the LCP restriction parameters, namely selecting at least one uplink grant.

In a case that the terminal uses a resource allocation mode based on network scheduling, a network is requested to perform resource allocation through a scheduling request (SR)/buffer status report (BSR) process, and the network device indicates an allocated uplink grant to the terminal by scheduling signaling.

Step 3: organizing MAC PDUs for at least one uplink grant.

For each uplink grant, MAC PDUs are organized according to an LCP process of the sidelink. The detailed implementation process can refer to the fourth scenario.

Fourth scenario, a LCP process of a sidelink based on a mapping relationship.

Based on LCP restriction parameters of the sidelink, a LCP process of the terminal on the sidelink is as follows:

For each uplink grant, resource allocation is performed as follows:

Step 1: for each uplink grant, selecting logical channels that are capable of using the uplink grant.

For each uplink grant, all logical channels which have data transmission requirements and are capable of using the uplink grant are selected as follows (following requirements need to be met simultaneously):

selecting a logical channel, where an SCS index of the logical channel for the uplink grant is included in configured allowedSCS-List; and selecting a logic channel whose configured maxPUSCH-Duration is greater than or equal to a duration of a PS SCH corresponding to the uplink grant.

Step 2: for each uplink grant, selecting a target ID that is capable of using the uplink grant.

According to all the logic channels selected in the step 1, a target corresponding to a logic channel that currently has a data transmission requirement and has the highest priority is selected.

Step 3: performing specific resource allocation for UL grant.

Step 3-1: the logical channels selected in the step 1 are subjected to further selection, logical channels belonging to the target selected in the step 2 are selected, and the selected logical channels are sorted according to a descending order of priorities.

Step 3-2: resources are allocated to respective logical channels sequentially in the descending order as determined in step 3-1 until the resources are exhausted, or data of all logical channels corresponding to the target ID are allocated with resources.

It should be noted that the resource allocation method for a sidelink according to the embodiments of the present disclosure can be used to resolve a problem of how to perform uplink resource allocation of the sidelink, in a case that a plurality of numerologies/TTIs are introduced into NR systems. Based on the resource allocation method for a sidelink, services can be ensured to be transmitted in appropriate uplink resources, so that QoS of the services can be better guaranteed.

Figure 3:
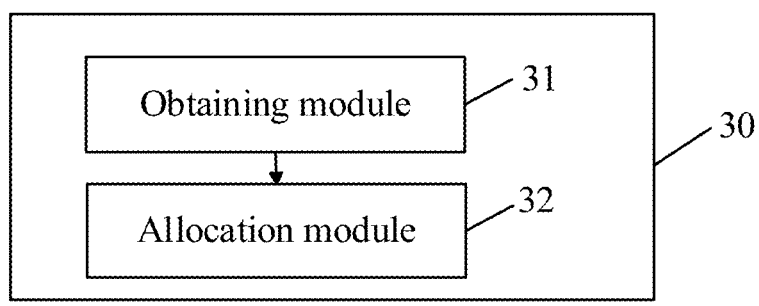
FIG. 3 shows a modular schematic diagram of a terminal according to an embodiment of the present disclosure.

As shown in FIG. 3, an embodiment of the present disclosure provides a terminal 30, which includes:

an obtaining module 31, configured to obtain a mapping relationship between a specific target of the sidelink and a logical channel priority (LCP) restriction parameter of the sidelink; and an allocation module 32, configured to perform resource allocation of the sidelink according to the mapping relationship, where the specific target includes: a Quality of Service (QoS) parameter or a logical channel.

Further, the LCP restriction parameter of the sidelink includes at least one of following information: allowed subcarrier spacing; or maximum physical sidelink shared channel (PSSCH) duration.

Further, when the terminal is on a network, the mapping relationship is configured by a network device or pre-configured; and when the terminal is off a network, the mapping relationship is pre-configured.

Optionally, in a case that the mapping relationship is configured by the network device, and the specific target includes the quality of service (QoS) parameter, the mapping relationship is configured in at least one of following manners: broadcasting; or first preset signaling, where the first preset signaling is a dedicated signaling, and the dedicated signaling includes at least one of: a radio resource control (RRC) signaling, a medium access control (MAC) signaling, or a physical layer signaling.

Further, in a case that the mapping relationship is configured by broadcasting, the mapping relationship is configured by using a preset message; and the preset message includes at least one of: a master information block (MIB) and a system information block (SIB) dedicated for the sidelink.

Optionally, in a case that the mapping relationship is configured by using the first preset signaling, the obtaining module 31 is configured to receive, from the network device, a mapping relationship between all the QoS parameters supported by the sidelink and the LCP restriction parameter of the sidelink.

Optionally, in a case that the mapping relationship is configured by using the first preset signaling, the obtaining module 31 is configured to:

receive, from the network device, a mapping relationship between a QoS parameter corresponding to a logical channel of the sidelink that currently has a data transmission requirement and the LCP restriction parameter of the sidelink; or receive, from the network device, a mapping relationship between a QoS parameter corresponding to a currently established logical channel of the sidelink and the LCP restriction parameter of the sidelink.

Further, before the obtaining module 31 obtains the mapping relationship between the specific target of the sidelink and the logical channel priority (LCP) restriction parameter of the sidelink, the terminal further includes: a first transmitting module configured to transmit first auxiliary information to the network device; where the first auxiliary information is used for enabling the network device to configure the mapping relationship between the QoS parameter and the LCP restriction parameter of the sidelink for the terminal.

Specifically, the first auxiliary information includes: the QoS parameter corresponding to the logical channel of the sidelink of the terminal that currently has the data transmission requirement; or the first auxiliary information includes: the QoS parameter corresponding to the currently established logical channel of the sidelink of the terminal.

Specifically, a triggering condition for reporting the first auxiliary information includes: event triggered report and/or periodical report.

Optionally, in case that the triggering condition for reporting the first auxiliary information includes event triggered report, an event for the event triggered report includes that: a QoS parameter of a direct communication service that currently has the data transmission requirement is changed caused by establishment of a logical channel or release of the logical channel of the sidelink of the terminal.

Optionally, in case that the triggering condition for reporting the first auxiliary information includes periodical report, a periodicity of the periodical report is configured by the network device and/or defined by a protocol.

Further, in case that the specific target includes the QoS parameter, the QoS parameter includes at least one of: priority of direct communication interface data packet (PPPP), reliability of direct communication interface data packet (PPPR), or packet delay budget (PDB) of direct communication interface data packet.

Optionally, in a case that the mapping relationship is configured by the network device, and the specific target includes a logical channel, the obtaining module 31 is configured to: receive the mapping relationship between the logical channel and the LCP restriction parameter of the sidelink, where the mapping relationship is configured by the network device by using a second preset signaling; where the logical channel is embodied in a form of: a combination of direct communication target identification information and direct communication interface logical channel identification information; or direct communication interface logical channel identification information.

Further, before the obtaining module 31 receives the mapping relationship between the logical channel and the LCP restriction parameter of the sidelink, where the mapping relationship is configured by the network device by using the second preset signaling, the terminal further includes: a second transmitting module configured to transmit second auxiliary information to the network device, where the second auxiliary information includes: the direct communication target identification information, the direct communication interface logical channel identification information, and a QoS parameter of a logical channel corresponding to the direct communication interface logical channel identification information; or, the second auxiliary information includes: the direct communication interface logical channel identification information, and a QoS parameter of a logical channel corresponding to the direct communication interface logical channel identification information.

Further, a triggering condition for reporting the second auxiliary information includes: event triggered report and/or periodical report.

Further, in case that the triggering condition for reporting the first auxiliary information includes event triggered report, an event for the event triggered report includes that: a QoS parameter of a direct communication service that currently has the data transmission requirement is changed caused by establishment of a logical channel or release of the logical channel of the sidelink of the terminal.

Further, in case that the triggering condition for reporting the first auxiliary information includes periodical report, a periodicity of the periodical report is configured by the network device and/or defined by a protocol.

Further, the allocation module 32 includes:

a first determination unit configured to determine, for each target uplink grant in allowed uplink grants, a target logical channel that is capable of using the target uplink grant;

a second determination unit configured to determine identification information of the first target according to the target logical channel; and an allocation unit configured to perform resource allocation of the sidelink according to the identification information of the first target.

Specifically, the first determination unit is configured to: determine, according to a preset condition, a target logical channel that is capable of using the target uplink grant and has a direct communication data transmission requirement; where the preset condition includes that:

an allowed subcarrier spacing list in the LCP restriction parameter corresponding to the target logical channel includes a subcarrier spacing corresponding to the target uplink grant; and an allowed maximum PSSCH duration in the LCP restriction parameter corresponding to the target logical channel is greater than or equal to a PSSCH transmission duration corresponding to the target uplink grant.

Specifically, the second determination unit is configured to:

select, among the target logical channels, a logical channel with the highest priority; and determine, according to the logic channel with the highest priority, a direct communication target identifier corresponding to the logic channel with the highest priority, and take the direct communication target identifier as the identification information of the first target.

Specifically, the allocation unit is configured to:

select all logical channels corresponding to the identification information of the first target from the target logical channels, and sort all the logical channels corresponding to the identification information of the first target in descending order of priorities; and allocate resources for respective logical channels sequentially according to the descending order of priorities until resources are allocated to all the logical channels or all the resources are exhausted.

It should be noted that the terminal embodiments involve a terminal corresponding to the above-mentioned method embodiments on a one-to-one basis, and all the implementations in the above-mentioned method embodiments are applicable to the terminal embodiments, and the same technical effects can be achieved.

Figure 4:
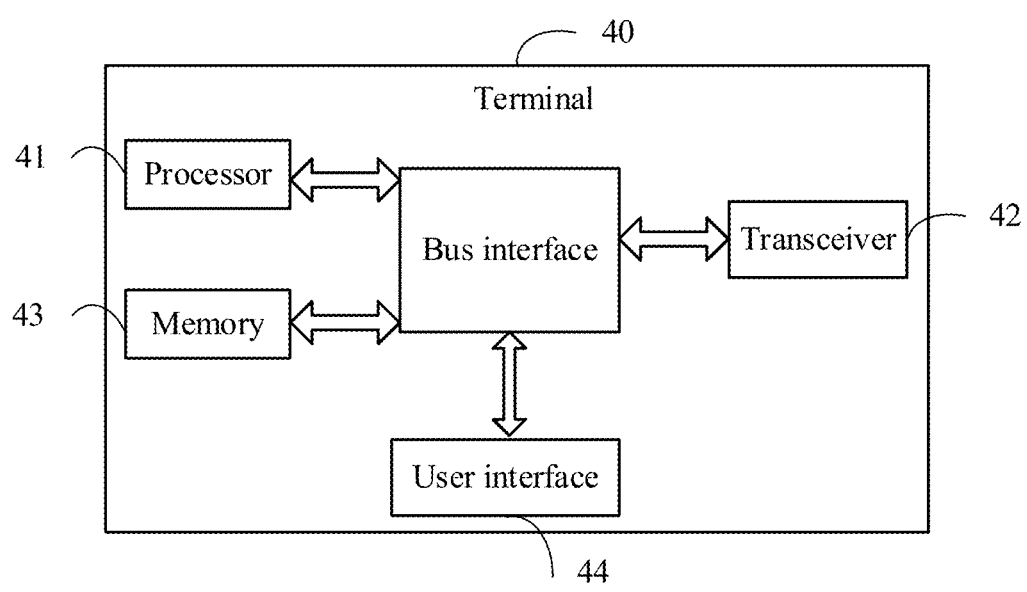
FIG. 4 shows a structural diagram of a terminal according to an embodiment of the present disclosure.

As shown in FIG. 4, an embodiment of the present disclosure further provides a terminal 40, which includes a processor 41, a transceiver 42, a memory 43, and a program stored on the memory 43 and executable on the processor 41. The transceiver 42 is connected, via a bus interface, to the processor 41 and the memory 43. The processor 41 is configured to read the program in the memory to performing the following processes:

obtaining a mapping relationship between a specific target of the sidelink and a logical channel priority (LCP) restriction parameter of the sidelink; and performing resource allocation of the sidelink according to the mapping relationship;

where the specific target includes: a Quality of Service (QoS) parameter or a logical channel.

It should be noted that in FIG. 4, the bus architecture may include any number of interconnected buses and bridges. Various circuits of one or more processors represented by processor 41 and a memory represented by memory 43 are specially linked together. The bus architecture may also link various other circuits, such as peripheral device, voltage regulator, power management circuit, etc., which is well known in the art, and thus will not be further described herein. The bus interface provides an interface. The transceiver 42 may be multiple elements, including a transmitter and receiver, providing a means for communicating with various other devices over a transmission medium. For different terminals, the user interface 44 may also be an interface capable of externally or internally connecting with a desired device. The connected device includes, but not limited to, a keypad, a display, a speaker, a microphone, a joystick, etc. The processor 41 is responsible for managing the bus architecture and general processing, and the memory 43 may store data used by the processor 41 in performing operations.

Specifically, the LCP restriction parameter of the sidelink includes at least one of following information:

allowed subcarrier spacing; or maximum physical sidelink shared channel (PSSCH) duration.

Specifically, when the terminal is on a network, the mapping relationship is configured by a network device or pre-configured; and when the terminal is off a network, the mapping relationship is pre-configured.

Optionally, in a case that the mapping relationship is configured by the network device, and the specific target includes the quality of service (QoS) parameter, the mapping relationship is configured in at least one of following manners:

broadcasting; or first preset signaling, where the first preset signaling is a dedicated signaling, and the dedicated signaling includes at least one of: a radio resource control (RRC) signaling, a medium access control (MAC) signaling, or a physical layer signaling.

Optionally, in a case that the mapping relationship is configured by broadcasting, the mapping relationship is configured by using a preset message; and the preset message includes at least one of: a master information block (MIB) and a system information block (SIB) dedicated for the sidelink.

Optionally, in a case that the mapping relationship is configured by using the first preset signaling, the processor executes the program to preform following steps:

receiving, from the network device, a mapping relationship between all the QoS parameters supported by the sidelink and the LCP restriction parameter of the sidelink.

Optionally, in a case that the mapping relationship is configured by using the first preset signaling, the processor executes the program to preform following steps:

receiving, from the network device, a mapping relationship between a QoS parameter corresponding to a logical channel of the sidelink that currently has a data transmission requirement and the LCP restriction parameter of the sidelink; or receiving, from the network device, a mapping relationship between a QoS parameter corresponding to a currently established logical channel of the sidelink and the LCP restriction parameter of the sidelink.

Further, before obtaining the mapping relationship between the specific target of the sidelink and the logical channel priority (LCP) restriction parameter of the sidelink, the processor executes the program to preform following steps:

transmitting first auxiliary information to the network device;

where the first auxiliary information is used for causing the network device to configure the mapping relationship between the QoS parameter and the LCP restriction parameter of the sidelink for the terminal.

Specifically, the first auxiliary information includes: the QoS parameter corresponding to the logical channel of the sidelink of the terminal that currently has the data transmission requirement; or the first auxiliary information includes: the QoS parameter corresponding to the currently established logical channel of the sidelink of the terminal.

Specifically, a triggering condition for reporting the first auxiliary information includes:

event triggered report and/or periodical report.

Specifically, in case that the triggering condition for reporting the first auxiliary information includes event triggered report, an event for the event triggered report includes that: a QoS parameter of a direct communication service that currently has the data transmission requirement is changed caused by establishment of a logical channel or release of the logical channel of the sidelink of the terminal.

Specifically, in case that the triggering condition for reporting the first auxiliary information includes periodical report, a periodicity of the periodical report is configured by the network device and/or defined by a protocol.

Further, in case that the specific target includes the QoS parameter, the QoS parameter includes at least one of: priority of direct communication interface data packet (PPPP), reliability of direct communication interface data packet (PPPR), or packet delay budget (PDB) of direct communication interface data packet.

Optionally, in a case that the mapping relationship is configured by the network device, and the specific target includes a logical channel, the processor executes the program to preform following steps:

receiving the mapping relationship between the logical channel and the LCP restriction parameter of the sidelink, where the mapping relationship is configured by the network device by using a second preset signaling;

where the logical channel is embodied in the form of: a combination of the direct communication target identification information and the direct communication interface logical channel identification information or the direct communication interface logical channel identification information.

Further, before receiving the mapping relationship between the logical channel and the LCP restriction parameter of the sidelink, where the mapping relationship is configured by the network device by using the second preset signaling, the processor executes the program to preform following steps:

transmitting second auxiliary information to the network device, where the second auxiliary information includes: the direct communication target identification information, direct communication interface logical channel identification information, and a QoS parameter of a logical channel corresponding to the direct communication interface logical channel identification information; or, the second auxiliary information includes: the direct communication interface logical channel identification information, and a QoS parameter of a logical channel corresponding to the direct communication interface logical channel identification information Specifically, a triggering condition for reporting the second auxiliary information includes:

event triggered report and/or periodical report.

Specifically, in a case that the triggering condition for reporting the second auxiliary information includes: the event triggered report, an event for the event triggered report includes: establishing a logical channel or releasing a logical channel by the terminal for the sidelink.

Specifically, the triggering condition for reporting the second auxiliary information includes: the periodical report, a periodicity of the periodical report is configured by the network device and/or defined by a protocol.

Optionally, the processor executes the program to preform following steps:

for each target uplink grant in allowed uplink grants, determining a target logical channel that is capable of using the target uplink grant;

determining identification information of the first target according to the target logical channel; and performing resource allocation of the sidelink according to the identification information of the first target.

Optionally, the processor executes the program to preform following steps:

determining, according to a preset condition, a target logical channel that is capable of using the target uplink grant and has a direct communication data transmission requirement;

where the preset condition includes that:

allowed subcarrier spacing list in the LCP restriction parameter corresponding to the target logical channel includes a subcarrier spacing corresponding to the target uplink grant; and allowed maximum PSSCH duration in the LCP restriction parameter corresponding to the target logical channel is greater than or equal to a PSSCH transmission duration corresponding to the target uplink grant.

Optionally, the processor executes the program to preform following steps:

selecting, among the target logical channels, a logical channel with the highest priority; and determining, according to the logic channel with the highest priority, a direct communication target identifier corresponding to the logic channel with the highest priority, and taking the direct communication target identifier as the identification information of the first target.

Optionally, the processor executes the program to preform following steps:

selecting all logical channels corresponding to the identification information of the first target from the target logical channels, and sorting all the logical channels corresponding to the identification information of the first target in descending order of priorities; and allocating resources for respective logical channels sequentially according to the descending order of priorities until the resources are allocated to all the logical channels or all the resources are exhausted.

The terminal according to the embodiments of the present disclosure obtains a mapping relationship between a specific target of a sidelink and a logical channel priority (LCP) restriction parameter of a sidelink, and performs resource allocation of the sidelink according to the mapping relationship. Thus, a network communication process is improved, and the normal data transmission can be guaranteed in the sidelink in a 5G system.

An embodiment of the present disclosure further provides a computer-readable storage medium, having a computer program stored thereon. The computer program is executed by a processor to implement steps of the resource allocation method for a sidelink applied to the terminal.

The foregoing is directed to optional embodiments of the present disclosure. It should be noted that a person of ordinary skill in the art may further make various modifications and polishments without departing from the principles of the present disclosure, and those modifications and polishments shall fall within the protection scope of the present disclosure.

What is claimed is:

1. A resource allocation method for a sidelink, applied to a terminal, comprising:
obtaining a mapping relationship between a specific target of the sidelink and a logical channel prioritization (LCP) restriction parameter of the sidelink; and
performing resource allocation of the sidelink according to the mapping relationship,
wherein the specific target comprises: a quality of service (QoS) parameter or a logical channel,
wherein when the terminal is in network coverage, the mapping relationship is configured by a network device or pre-configured; and when the terminal is out of network coverage, the mapping relationship is pre-configured,
wherein in a case that the mapping relationship is configured by the network device, and the specific target comprises the quality of service (QoS) parameter, the mapping relationship is configured in at least one of following manners:
broadcasting; or
a first preset signaling,
wherein the first preset signaling is a dedicated signaling, and the dedicated signaling comprises at least one of: a radio resource control (RRC) signaling, a medium access control (MAC) signaling, or a physical layer signaling,
or,
wherein in a case that the mapping relationship is configured by the network device, and the specific target comprises the logical channel, the obtaining the mapping relationship between the specific target of the sidelink and the logical channel prioritization (LCP) restriction parameter of the sidelink comprises:
receiving the mapping relationship between the logical channel and the LCP restriction parameter of the sidelink, wherein the mapping relationship is configured by the network device by using a second preset signaling,
wherein the logical channel is embodied in a form of: a combination of sidelink communication destination identification information and sidelink communication interface logical channel identification information; or sidelink communication interface logical channel identification information.

2. The resource allocation method for a sidelink according to claim 1, wherein the LCP restriction parameter of the sidelink comprises at least one of following information:
allowed subcarrier spacing; or
maximum physical sidelink shared channel (PSSCH) duration.

3. The resource allocation method for a sidelink according to claim 1, wherein in a case that the mapping relationship is configured by broadcasting, the mapping relationship is configured by using a preset message; and
the preset message comprises at least one of: a master information block (MIB) and a system information block (SIB) dedicated for the sidelink.

4. The resource allocation method for a sidelink according to claim 1, wherein in a case that the mapping relationship is configured by using the first preset signaling, the obtaining the mapping relationship between the specific target of the sidelink and the logical channel prioritization (LCP) restriction parameter of the sidelink comprises:
receiving, from the network device, a mapping relationship between all the QoS parameters supported by the sidelink and the LCP restriction parameter of the sidelink.

5. The resource allocation method for a sidelink according to claim 1, wherein in a case that the mapping relationship is configured by using the first preset signaling, the obtaining the mapping relationship between the specific target of the sidelink and the logical channel prioritization (LCP) restriction parameter of the sidelink comprises:
receiving, from the network device, a mapping relationship between a QoS parameter corresponding to a logical channel of the sidelink that currently has a data transmission requirement and the LCP restriction parameter of the sidelink; or
receiving, from the network device, a mapping relationship between a QoS parameter corresponding to a currently established logical channel of the sidelink and the LCP restriction parameter of the sidelink.

6. The resource allocation method for a sidelink according to claim 5, wherein before obtaining the mapping relationship between the specific target of the sidelink and the logical channel prioritization (LCP) restriction parameter of the sidelink, the method further comprises:
transmitting first auxiliary information to the network device;
wherein the first auxiliary information is used for enabling the network device to configure the mapping relationship between the QoS parameter and the LCP restriction parameter of the sidelink for the terminal.

7. The resource allocation method for a sidelink according to claim 6, wherein the first auxiliary information comprises: the QoS parameter corresponding to the logical channel of the sidelink of the terminal that currently has the data transmission requirement; or
the first auxiliary information comprises: the QoS parameter corresponding to the currently established logical channel of the sidelink of the terminal.

8. The resource allocation method for a sidelink according to claim 6, wherein a triggering condition for reporting the first auxiliary information comprises:
event triggered report and/or periodical report.

9. The resource allocation method for a sidelink according to claim 8, wherein in case that the triggering condition for reporting the first auxiliary information comprises the event triggered report, an event for the event triggered report comprises that: a QoS parameter of a sidelink communication service that currently has the data transmission requirement is changed caused by establishment of a logical channel or release of the logical channel of the sidelink of the terminal; or
wherein in case that the triggering condition for reporting the first auxiliary information comprises the periodical report, a periodicity of the periodical report is configured by the network device and/or defined by a protocol.

10. The resource allocation method for a sidelink according to claim 1, wherein in case that the specific target comprises the QoS parameter, the QoS parameter comprises at least one of: priority of sidelink communication interface data packet (PPPP), reliability of sidelink communication interface data packet (PPPR), or packet delay budget (PDB) of sidelink communication interface data packet.

11. The resource allocation method for a sidelink according to claim 1, wherein before receiving the mapping relationship between the logical channel and the LCP restriction parameter of the sidelink, wherein the mapping relationship is configured by the network device by using the second preset signaling, the method further comprises:
transmitting second auxiliary information to the network device,
wherein the second auxiliary information comprises: the sidelink communication target identification information, the sidelink communication interface logical channel identification information, and a QoS parameter of a logical channel corresponding to the sidelink communication interface logical channel identification information; or,
the second auxiliary information comprises: the communication interface logical channel identification information, and a QoS parameter of a logical channel corresponding to the sidelink communication interface logical channel identification information.

12. The resource allocation method for a sidelink according to claim 11, wherein a triggering condition for reporting the second auxiliary information comprises:
event triggered report and/or periodical report.

13. The resource allocation method for a sidelink of claim 12, wherein in a case that the triggering condition for reporting the second auxiliary information comprises: the event triggered report, an event for the event triggered report comprises: the sidelink of the terminal establishing a logical channel or releasing the logical channel; or
wherein in a case that the triggering condition for reporting the second auxiliary information comprises: the periodical report, a periodicity of the periodical report is configured by the network device and/or defined by a protocol.

14. The resource allocation method for a sidelink according to claim 1, wherein the performing resource allocation of the sidelink according to the mapping relationship comprises:
for each target uplink grant in allowed uplink grants, determining a target logical channel that is capable of using the target uplink grant;
determining identification information of the first target according to the target logical channel; and
performing resource allocation of the sidelink according to the identification information of the first target.

15. The resource allocation method for a sidelink according to claim 14, wherein the determining the target logical channel that is capable of using the target uplink grant comprises:
determining, according to a preset condition, a target logical channel that is capable of using the target uplink grant and has a sidelink communication data transmission requirement;
wherein the preset condition comprises that:
an allowed subcarrier spacing list in the LCP restriction parameter corresponding to the target logical channel comprises a subcarrier spacing corresponding to the target uplink grant; and
an allowed maximum PSSCH duration in the LCP restriction parameter corresponding to the target logical channel is greater than or equal to a PSSCH transmission duration corresponding to the target uplink grant; or
wherein the determining identification information of the first target according to the target logical channel comprises:
selecting, among the target logical channels, a logical channel with the highest priority; and
determining, according to the logic channel with the highest priority, a sidelink communication target identifier corresponding to the logic channel with the highest priority, and taking the sidelink communication target identifier as the identification information of the first target; or
wherein the performing resource allocation of the sidelink according to the identification information of the first target comprises:
selecting, from the target logical channels, all logical channels corresponding to the identification information of the first target, and sorting all the logical channels corresponding to the identification information of the first target in a descending order of priorities; and
allocating resources for respective logical channels sequentially according to the descending order of priorities, until resources are allocated to all the logical channels or all the resources are exhausted.

16. A terminal, comprising a memory, a processor, and a program stored on the memory and executable on the processor, wherein when executing the program, the processor is configured to implement following steps:
obtaining a mapping relationship between a specific target of the sidelink and a logical channel prioritization (LCP) restriction parameter of the sidelink; and
performing resource allocation of the sidelink according to the mapping relationship,
wherein the specific target comprises: a Quality of Service (QoS) parameter or a logical channel,
wherein when the terminal is in network coverage, the mapping relationship is configured by a network device or pre-configured; and when the terminal is out of network coverage, the mapping relationship is pre-configured,
wherein in a case that the mapping relationship is configured by the network device, and the specific target comprises the quality of service (QoS) parameter, the mapping relationship is configured in at least one of following manners:
broadcasting; or
a first preset signaling,
wherein the first preset signaling is a dedicated signaling, and the dedicated signaling comprises at least one of: a radio resource control (RRC) signaling, a medium access control (MAC) signaling, or a physical layer signaling,
or,
wherein in a case that the mapping relationship is configured by the network device, and the specific target comprises the logical channel, the obtaining the mapping relationship between the specific target of the sidelink and the logical channel prioritization (LCP) restriction parameter of the sidelink comprises:
receiving the mapping relationship between the logical channel and the LCP restriction parameter of the sidelink, wherein the mapping relationship is configured by the network device by using a second preset signaling, wherein the logical channel is embodied in a form of: a combination of sidelink communication destination identification information and sidelink communication interface logical channel identification information; or sidelink communication interface logical channel identification information.

17. A non-transitory computer-readable storage medium, having a computer program stored thereon, wherein the computer program is executed by a processor to implement following steps:

obtaining a mapping relationship between a specific target of the sidelink and a logical channel prioritization (LCP) restriction parameter of the sidelink; and performing resource allocation of the sidelink according to the mapping relationship, wherein the specific target comprises: a quality of service (QoS) parameter or a logical channel, wherein when the terminal is in network coverage, the mapping relationship is configured by a network device or pre-configured; and when the terminal is out of network coverage, the mapping relationship is pre-configured, wherein in a case that the mapping relationship is configured by the network device, and the specific target comprises the quality of service (QoS) parameter, the mapping relationship is configured in at least one of following manners:

broadcasting; or a first preset signaling, wherein the first preset signaling is a dedicated signaling, and the dedicated signaling comprises at least one of: a radio resource control (RRC) signaling, a medium access control (MAC) signaling, or a physical layer signaling, or, wherein in a case that the mapping relationship is configured by the network device, and the specific target comprises the logical channel, the obtaining the mapping relationship between the specific target of the sidelink and the logical channel prioritization (LCP) restriction parameter of the sidelink comprises:

receiving the mapping relationship between the logical channel and the LCP restriction parameter of the sidelink, wherein the mapping relationship is configured by the network device by using a second preset signaling, wherein the logical channel is embodied in a form of: a combination of sidelink communication destination identification information and sidelink communication interface logical channel identification information; or sidelink communication interface logical channel identification information.

18. The terminal according to claim 16, wherein the LCP restriction parameter of the sidelink comprises at least one of following information:

allowed subcarrier spacing; or maximum physical sidelink shared channel (PSSCH) duration.

19. The terminal according to claim 16, wherein in a case that the mapping relationship is configured by broadcasting, the mapping relationship is configured by using a preset message; and the preset message comprises at least one of: a master information block (MIB) and a system information block (SIB) dedicated for the sidelink.

20. The non-transitory computer-readable storage medium according to claim 17, wherein the LCP restriction parameter of the sidelink comprises at least one of following information:

allowed subcarrier spacing; or maximum physical sidelink shared channel (PSSCH) duration.

* * * * *